United States Patent [19]
Frech et al.

[11] 3,920,765
[45] Nov. 18, 1975

[54] INHIBITION OF POLYMERIZATION DURING THE ISOMERIZATION OF OLEFINS

[75] Inventors: Kenneth J. Frech; Roger W. Spoerke, both Akron, Ohio

[73] Assignee: The Goodyear Tire & Rubber Company, Akron, Ohio

[22] Filed: Nov. 12, 1973

[21] Appl. No.: 415,258

[52] U.S. Cl. ............................................ 260/683.2
[51] Int. Cl.² ......................................... C07C 5/30
[58] Field of Search .................. 260/683.2, 680 C

[56] References Cited
UNITED STATES PATENTS

| | | | |
|---|---|---|---|
| 3,037,052 | 5/1962 | Bortnick | 260/683.15 |
| 3,104,269 | 9/1963 | Schaffel | 260/680 C |
| 3,151,179 | 9/1964 | Kennedy et al. | 260/683.2 |
| 3,327,000 | 6/1967 | Keith et al. | 260/680 C |
| 3,370,101 | 2/1968 | Hayes et al. | 260/683.2 |
| 3,424,810 | 1/1969 | Suatoni | 260/683.2 |

FOREIGN PATENTS OR APPLICATIONS 190,887  3/1967  U.S.S.R. ........................ 260/680 C

*Primary Examiner*—Delbert E. Gantz
*Assistant Examiner*—G. J. Crasanakis
*Attorney, Agent, or Firm*—F. W. Brunner; J. Y. Clowney

[57] ABSTRACT

There is disclosed an improved process for the isomerization of 1-olefins containing tertiary carbon atoms by means of a catalyst comprising sulfonated ion-exchange resins. The improvement comprises the use of very small amounts of water or water producing materials to inhibit the polymerization of the feed stock by the catalyst.

7 Claims, No Drawings

INHIBITION OF POLYMERIZATION DURING THE ISOMERIZATION OF OLEFINS

This invention is directed to an improved process for the isomerization of branch chain 1-olefins containing a tertiary carbon atom to form the corresponding 2-olefins. More particularly, it is directed to an improved process for the isomerization of branch chain olefins from the group of 2,3-dimethyl-1-butene, 2-methyl-1-pentene, 2-ethyl-1-butene, and 2-methyl-1-butene to form 2,3-dimethyl-2-butene, 2-methyl-2-pentene, 3-methyl-2-pentene and 2-methyl-2-butene respectively using a sulfonated ion-exchange resin as a catalyst, in which a polymerization inhibitor is employed to prevent the loss of the feed stock and/or product due to high polymer formation and the subsequent loss of catalyst activity.

Various processes are known in the art for shifting the double bonds of 1-olefins to a more internal position to yield 2-olefins. Many of these prior art processes produce results or effects which are often undesirable, such as polymerization, catalytic degradation of the feed stock and/or the product produced and sometimes skeletal rearrangement which is often undesirable. Other disadvantages of some of the prior art processes are that low conversions are obtained per pass and in order to improve the conversion low space velocities must be employed. Still other disadvantages are that low selectivities to the desired product.

It has now been discovered that an improvement in the isomerization of tertiary olefins from the group of 2,3-dimethyl-1-butene, 2-methyl-1-pentene, 2-ethyl-1-butene and 2-methyl-1-butene by means of sulfonated ion-exchange resins can be obtained by the use of small amounts of water or materials which will release water at the isomerization conditions employed. The improvement is the fact that the water inhibits the formation of polymer from the polymerization of the feed 1-olefin. The process of this invention provides high throughput rates, high selectivities, and keeps the yield of undesirable by-products at a minimum. It also allows the use of liquid phase isomerization at ambient temperatures and pressures. It also suppresses the loss of catalyst activity by the polymer formed without the use of water.

The catalysts employed in the isomerization process of this application are ion-exchange resins which are made by first forming an insoluble, infusible co-polymer of, for instance, styrene and divinyl benzene, into which active acidic or basic groups can be introduced. Other monomers may be used to prepare the resins, such as epoxy amine types. A particular catalyst suitable for this invention are the macrorectictular type sulfonated resins which are made by including in the polymerization of, for instance, the styrene and divinyl benzene, an inert material which is eventually washed out leaving large voids in the resins, such as macrorecticular pores. It is this type of resin which is initially employed in this invention. After these macrorectictular ion-exchange, for instance, styrene-divinyl benzene resins, are prepared, they are treated with sulfuric acid to obtain the particular sulfonated ion-exchange resins useful as catalysts in this invention. The sulfonic acid groups are attached to the benzene nuclei of the resins.

A very useful catalyst for the practice of this invention are those prepared by polymerizing styrene and divinyl benzene which contains macropores and then treating the resin with sulfuric acid to provide sulfonic acid groups on the benzene nuclei. The resins so treated are washed with water to remove any residual sulfates and excess hydrogen ions.

Examples of some sulfonated macrorectictular styrene-divinyl benzene resins of the type described for use in this application are MSC-1-H by the Dow Chemical Company and XN-1005, XN-1010 and XE-284 by Rohm and Haas Company.

It has been observed that the formation of high polymers of the branched chain 1-olefins containing tertiary carbon atoms will deposit on these catalyst and lower the activity of such catalyst if not suppressed by the practice of the improvement of this invention. Thus, the use of from about 0.05 percent to about 1.0 percent by weight of water in the isomerization process could be said to be an improvement of the process disclosed and claimed in the co-pending application Ser. No. 415,259, filed Nov. 12, 1973, titled ISOMERIZATION OF BRANCHED CHAIN 1-OLEFINS TO BRANCHED CHAIN 2-OLEFINS, filed on even day herewith.

It has been observed that since the isomerization of this invention is conducted in a liquid phase, there is little need for the use of diluents. However, this is not to say that diluents cannot be employed. If desired, any inert diluent, such as liquid aliphatic or aromatic hydrocarbons which may not contain ethylenic unsaturation, may be employed.

In actual practice of the invention, it is usually desirable to pass the particular tertiary olefin over the fixed bed catalyst at a liquid hour space velocity (LHSV) of 0.5 to 40, with LHSV's of 5 to 15 being more preferred. The reaction temperature, in the case of 1-olefins, may vary widely from about 5°C. to about 80°C., with a more moderate temperature of 20°C. to 60°C. being preferred. Room temperature is a convenient temperature to employ when using 1-olefins.

As has been stated previously, the use of water in the isomerization of branched chain 1-olefins containing a tertiary carbon atom by passing the mixture of 1-olefin and water or a material which will release water at the operating conditions over a sulfonated ion-exchange resin catalyst is the invention of this application.

Water is, of course, very slightly soluble in hydrocarbons, and is very difficult to mix with such materials as the 1-olefins isomerized in accordance with the present invention. For that reason it is desirable to employ materials which are soluble or miscible with such hydrocarbons which will produce water at the isomerization conditions. Aliphatic alcohols will dehydrate at the isomerization conditions to introduce water into the system. For that reason, they are one desired method of introducing water. Representative examples of some useful aliphatic alcohols are ethyl alcohol, isopropyl alcohol, n-butyl alcohol, t-butyl alcohol, isoamyl alcohol, n-propanol, 3-hydroxy-3-methyl propane, and other aliphatic alcohols which are soluble in or miscible with the tertiary branched chain 1-olefins mentioned elsewhere.

It has been found that there is required about 0.05 percent by weight of water to effectively suppress the formation of polymer. If too much water is employed, the excess water tends to deactivate the activity of the catalyst. However, if the source of water is stopped, the catalyst dries out and its activity is restored to normal. It has been found that about 1.0 percent by weight of water is about the upper limit of water. The preferred amount of water is from 0.07 to 0.3 percent by weight. One can calculate the amount of alcohol needed to produce these amounts of water. For instance, when 0.8 gram of 3-hydroxy-3-methylpentane is used to 150 grams of 2-methyl-1-pentene as in Example III:

3-OH-3-methylpentane → 3-methyl-2-pentane+H$_2$O
M.W. = 102                   M.W. = 18

$$\frac{0.8}{102} = \frac{X}{18} \quad X = 0.142 \text{ gram}$$

$$\frac{0.142}{150} = 0.094\% \text{ H}_2\text{O approximately}$$

This assumes about 95 percent dehydration of the alcohol.

The invention is further illustrated by reference to the following examples which are designed to be illustrative and not in any way limiting to the scope of this invention.

EXAMPLE I

In this example, a series of experiments was conducted in which a mixture of 150 grams of 2-methyl-1 pentene and 0.09 gram of 3-OH-3-methyl pentane in liquid form was passed over a dried macrorecticular ion-exchange resin obtained by sulfonating a copolymer of divinyl benzene-styrene in the form of beads. This mixture, thus, contained 0.01 percent H$_2$O with respect to the olefin. The isomerizations were conducted at 40°C. and at 7.5 LHSV. The procedure was to establish a flow rate and sample the effluent at 30 minute intervals which were analyzed for percent high polymer of the 2-methyl-1-pentene and/or 2-methyl-2-pentene and 2-methyl-2-pentene. The results are set forth in the table below in which Column 1 is the experiment number, Column 2 is the time on stream in minutes, Column 3 is the percent polymer based on the amount of 2-olefin with respect to 1-olefin converted and Column 4 is the percent by weight of 2-methyl-2-pentene (2M2P) obtained.

| No. | Time on Stream (min) | % Polymer | % 2M2P |
|---|---|---|---|
| 1 | 0–30 | 2.0 | 84.0 |
| 2 | 30–60 | 2.7 | 85.0 |
| 3 | 100–120 | 6.7 | 86.0 |

As can be determined from the results obtained above, polymer formation is utilizing certain of the reactant and/or products in a form which is undesirable. The sulfonated ion-exchange resins before the operation had a surface area of 132 square meters per gram and only 90 square meters after 125 minutes leading to the conclusion that polymer formation was deactivating and plugging the pores of the ion-exchange catalyst.

EXAMPLE II

In this example, 3-OH-3-methylpentane (3OH3MP) was employed as a polymerization inhibitor. A mixture of 150 grams of 2-methyl-1-pentene (2M2P) and 0.19 gram of the 3OH3MP was mixed and passed over a catalyst under identical conditions as in Example I except that the times of sampling varied slightly. This amount of alcohol will dehydrate to give approximately 0.02 percent water with respect to the 2-methyl-1-pentene.

The results are given in the table below wherein the columns are identical to those of Example I.

| No. | Time on Stream (min) | % Polymer | % 2M2P |
|---|---|---|---|
| 1 | 0–70 | 2.0 | 83.0 |
| 2 | 110–140 | 4.4 | 86.0 |
| 3 | 170–200 | 5.8 | — |
| 4 | 200–230 | 6.5 | 86.5 |

Again, in this example there appears not to be an ideal amount of inhibitor present.

EXAMPLE III

In this series of experiments more alcohol was used, as the blend of feed was a mixture of 150 grams of 2-methyl-1-pentene and 0.8 gram of 3OH3MP, resulting in 0.094 percent of water. The results are below.

| No. | Time on Stream (min) | % Polymer | % 2M2P |
|---|---|---|---|
| 1 | 0–30 | 0.15 | 75.0 |
| 2 | 90–110 | 0.47 | 84.0 |
| 3 | 170–200 | 0.64 | 85.0 |
| 4 | 230–260 | 0.55 | 85.0 |
| 5 | 260–290 | 0.48 | 85.0 |
| 6 | 300–330 | 0.54 | 85.0 |

In these experiments, the polymer formed seems acceptable as the catalyst was not reduced in activity as the times increased. Thus, the water here suppressed the polymerization.

While certain representative embodiments and details have been shown for the purpose of illustrating the invention, it will be apparent to those skilled in this art that various changes and modifications may be made therein without departing from the spirit or scope of the invention.

What is claimed is:

1. In a process for isomerization which comprises subjecting olefins selected from the group consisting of 2,3-dimethyl-1-butene, 2-methyl-1-pentene, 2-ethyl-1-butene, and 2-methyl-1-butene to a catalyst consisting of macroreticular sulfonated, ion-exchange resins, said isomerization being conducted in the liquid phase at a temperature between 5°C and 80°C and at liquid hour space velocities between about 0.5 and about 40, the improvement comprising adding to said isomerization from about 0.5 to about 1 percent by weight of water based on said olefins.

2. The process according to claim 1 in which the water is introduced to said isomerization by means of aliphatic alcohols.

3. The process according to claim 1 in which the sulfonated ion-exchange resin is prepared by copolymerizing styrene and divinyl benzene followed by sulfonation.

4. The process according to claim 1 in which the 1-olefin subjected to the catalyst is 2,3-dimethyl-1-butene.

5. The process according to claim 1 in which the 1-olefin subjected to the catalyst is 2-methyl-1-pentene.

6. The process according to claim 1 in which the 1-olefin subjected to the catalyst is 2-methyl-1-butene.

7. The process according to claim 1 in which the 1-olefin subjected to the catalyst is 2-ethyl-1-butene.

* * * * *

UNITED STATES PATENT OFFICE
CERTIFICATE OF CORRECTION

PATENT NO. : 3,920,765
DATED : November 18, 1975
INVENTOR(S) : Kenneth J. Frech and Roger W. Spoerke It is certified that error appears in the above-identified patent and that said Letters Patent are hereby corrected as shown below:

Column 3, line 6, the first line of the formula should read:

3-OH-3-methylpentane     3-methyl-2-pentene+$H_2O$

Signed and Sealed this

Twelfth Day of October 1976

[SEAL]

Attest:

RUTH C. MASON
*Attesting Officer*

C. MARSHALL DANN
*Commissioner of Patents and Trademarks*